(12) United States Patent
Husband et al.

(10) Patent No.: US 8,020,708 B2
(45) Date of Patent: Sep. 20, 2011

(54) FUEL FILTER HOUSING WITH SNAP LOCK VALVE ASSSEMBLY

(75) Inventors: Jeffrey A. Husband, Cookeville, TN (US); Chad T. Brummitt, Algood, TN (US); Gregory Shope, Cookeville, TN (US); Wassem Abdalla, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 632 days.

(21) Appl. No.: 12/152,373

(22) Filed: May 14, 2008

(65) Prior Publication Data
US 2009/0242816 A1 Oct. 1, 2009

Related U.S. Application Data

(63) Continuation-in-part of application No. 12/058,225, filed on Mar. 28, 2008, now abandoned.

(51) Int. Cl.
| | |
|---|---|
| *F16K 51/00* | (2006.01) |
| *F16L 37/28* | (2006.01) |
| *B01D 35/00* | (2006.01) |
| *B01D 35/30* | (2006.01) |
| *B01D 29/92* | (2006.01) |
| *B01D 27/00* | (2006.01) |

(52) U.S. Cl. ............ 210/437; 251/149.9; 251/143; 210/234; 210/235; 210/418; 210/429; 210/430; 210/438; 210/440; 210/435; 210/443

(58) Field of Classification Search ............ 210/234, 210/235, 418, 429, 430, 438, 440
See application file for complete search history.

(56) References Cited

U.S. PATENT DOCUMENTS

| | | | | | |
|---|---|---|---|---|---|
| 4,071,045 | A | * | 1/1978 | Brandt | 137/528 |
| 5,242,581 | A | * | 9/1993 | Mohr | 210/136 |
| 5,902,479 | A | * | 5/1999 | Fukumori et al. | 210/248 |
| 6,884,349 | B1 | | 4/2005 | Jiang | |

OTHER PUBLICATIONS

Co-pending U.S. Appl. No. 11/839,025, filed Aug. 15, 2007.
Co-pending U.S. Appl. No. 11/854,019, filed Sep. 12, 2007.
Co-pending U.S. Appl. No. 11/937,700, filed Nov. 9, 2007.
Co-pending U.S. Appl. No. 12/058,225, filed Mar. 28, 2008.

* cited by examiner

*Primary Examiner* — Benjamin Kurtz
(74) *Attorney, Agent, or Firm* — Hamre, Schumann, Mueller & Larson, P.C.

(57) ABSTRACT

A valve assembly that is useable with a fuel filter housing to control the flow of fuel through the fuel filter housing. The valve assembly comprises two primary parts that are connected together via a snap connection, and when the valve assembly is installed on the fuel filter housing, means on the fuel filter housing prevent disconnection of the snap connection. One or both of the primary parts of the valve assembly can be provided with a tamper evident feature that will indicate whether someone has tried to remove or disassemble the valve assembly.

13 Claims, 5 Drawing Sheets

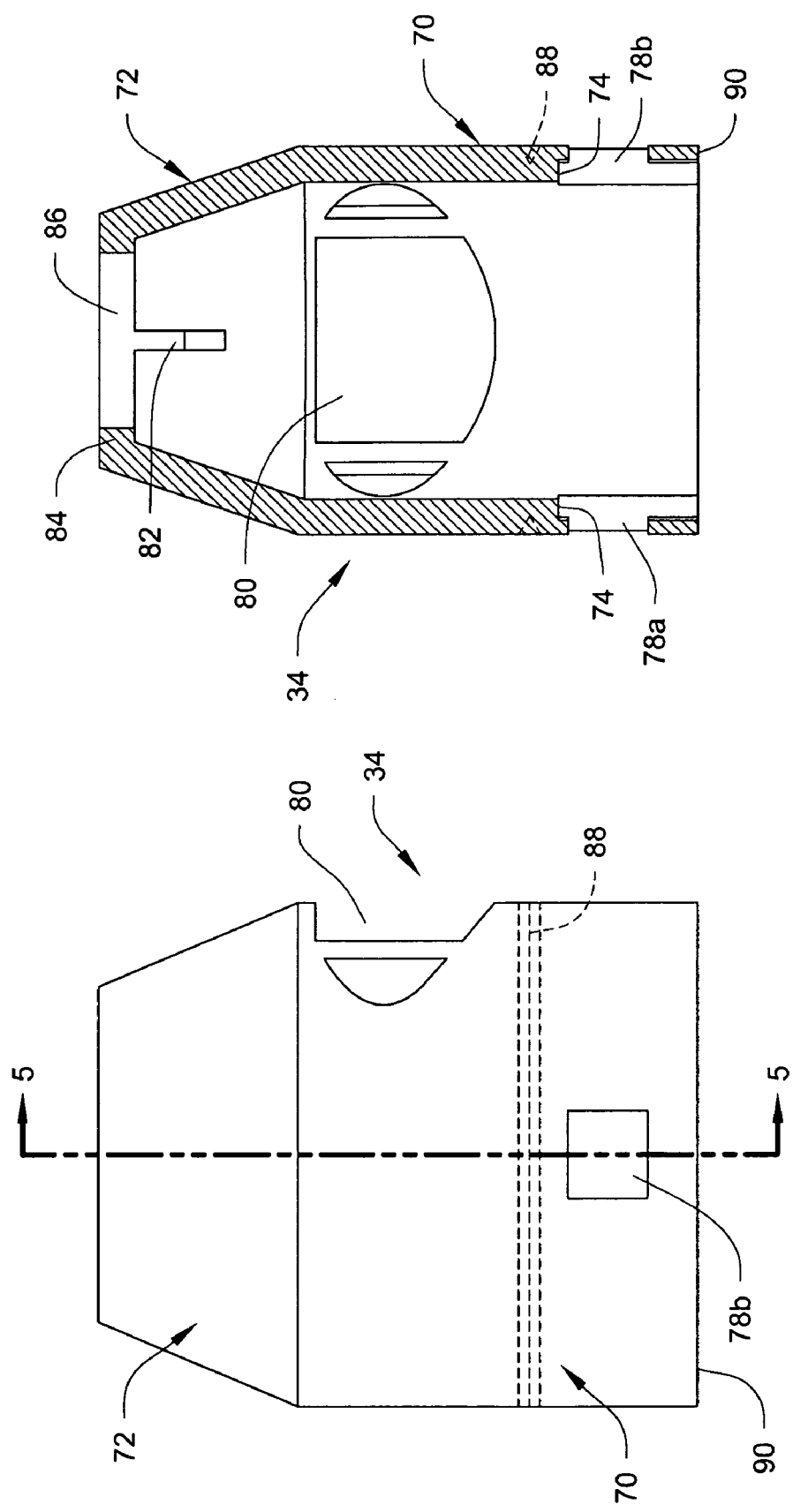

FUEL FILTER HOUSING WITH SNAP LOCK VALVE ASSSEMBLY

This application is a continuation-in-part application of pending application Ser. No. 12/058,225, filed on Mar. 28, 2008, entitled FUEL FILTER HOUSING WITH SNAP LOCK VALVE ASSEMBLY, the entire contents of which are incorporated herein by reference.

FIELD

This disclosure generally pertains to the field of filtration, and more particularly to a fuel filter housing with a valve that controls fuel flow through the fuel filter housing.

BACKGROUND

It is known to use a valve in a fuel filter housing to control fuel flow through the housing. One example of such a valve in a fuel filter housing is sometimes referred to as a "no filter, no run" valve, where the valve prevents flow of fuel to the engine if no fuel filter is installed or if the incorrect fuel filter is installed. In this type of system, not only must a fuel filter be present, but the correct fuel filter must be used, in order to allow fuel to flow past the valve to the engine in sufficient quantities to allow the engine to function properly. However, if the valve is removed, fuel can flow to the engine if no filter is installed or if an incorrect filter is installed.

SUMMARY

A valve assembly that is useable with a fuel filter housing to control the flow of fuel through the fuel filter housing. The valve assembly comprises two primary parts that are connected together via a snap connection, and when the valve assembly is installed on the fuel filter housing, means on the fuel filter housing prevent disconnection of the snap connection. One or both of the primary parts of the valve assembly can be provided with a tamper evident feature that will indicate whether someone has tried to remove or disassemble the valve assembly.

The valve assembly can be used at any location in or on the fuel filter housing for controlling fuel flow through, including into, the fuel filter housing. One exemplary use of the valve assembly is on a post in the fuel filter housing as part of a "no filter, no run" system. In a "no filter, no run" system, fuel flow to the engine is prevented altogether or permitted in an amount insufficient to allow engine operation if a filter is not installed or if an incorrect filter is installed, and an appropriately designed filter is required to be used in order to permit sufficient fuel flow for engine operation.

The valve assembly is designed to lock to the filter housing, thereby preventing someone from removing or tampering with the valve assembly. In addition, the valve assembly is designed to give visual evidence if someone tries to tamper with the valve assembly or remove the valve assembly from the filter housing.

In one embodiment, a valve assembly for attachment to a fuel filter housing for controlling fuel flow through the fuel filter housing includes a first valve assembly piece configured for attachment to the fuel filter housing, and a second valve assembly piece connected to the first valve assembly piece. A snap connection between the first piece and the second piece is provided by which the first piece and the second piece snap fit connect to each other. The snap connection is configured and positioned such that when the valve assembly is attached to the fuel filter housing, disconnection of the snap connection is prevented by a suitable means on the fuel filter housing.

When the valve assembly is used on a post of the filter housing, the means to prevent disconnection of the snap connection can be, for example, the post itself, a raised lip on the post that interfaces with the back side of the snap connection to prevent disconnection, or a groove formed in the end of the post that receives a portion of the snap connection.

In addition, a tamper evident feature can be provided on one or both of the valve assembly pieces. The tamper evident feature can be, for example, an engineered weak point formed on the first valve assembly piece and/or the second valve assembly piece. The engineered weak point creates a weak point in the part so that if someone tries to tamper with or remove one or both of the valve assembly pieces, the part can break at the weak point and cannot be reattached.

DESCRIPTION OF THE DRAWINGS

FIG. 4 is a side view of the valve cover of the valve assembly.

FIG. 5 is a cross-sectional view of the valve cover of FIG. 4 taken along line 5-5.

DETAILED DESCRIPTION

Figure 1:
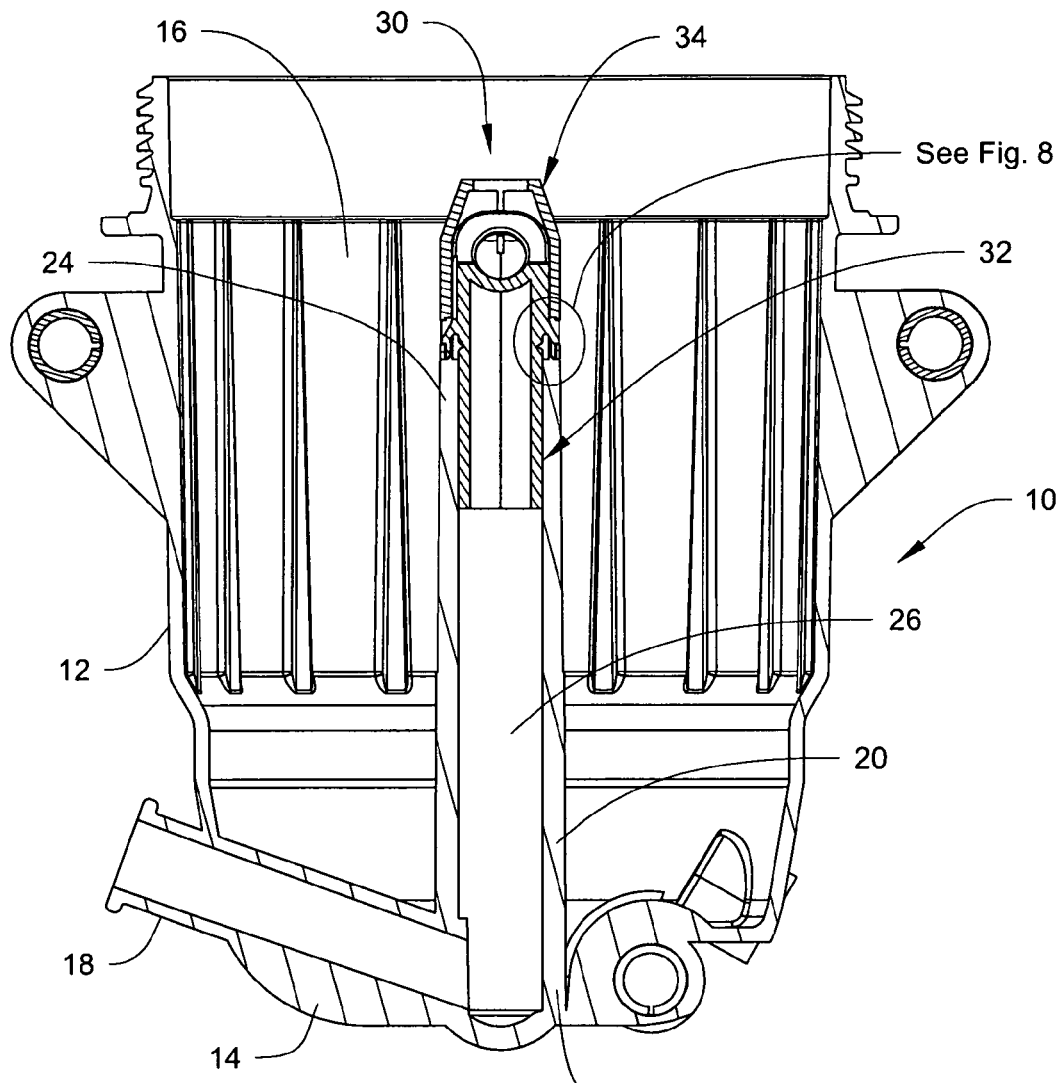
FIG. 1 is a cross-sectional view of a fuel filter housing that incorporates the snap lock valve assembly, with the snap lock valve assembly attached to the housing.

FIG. 1 illustrates a filter housing 10, for example a fuel filter housing, that is designed to receive a filter (not shown) therein that is intended to filter a fluid, for example diesel fuel, before the fluid reaches a protected system, for example a fuel injection pump and fuel injectors. In appropriate circumstances, one or more of the concepts described herein can be applied to other types of filters that filter other types of fluids, for example lubrication, hydraulic and other liquids, as well as air.

As discussed further below, a valve assembly is described that attaches to the filter housing 10 for controlling fuel flow through the housing. The concepts of the valve assembly described herein can be applied to any valve assembly used to control fuel flow through, including into, the filter housing 10. For sake of convenience in explaining the inventive concepts, the valve assembly will be described as being attached to a post in the filter housing. However, the inventive concepts can be applied to a valve assembly attached anywhere in or on the filter housing.

The filter housing 10 is of generally conventional construction and includes a housing body that has a side wall 12 and an end wall 14. The side wall 12 and the end wall 14 define a filter space 16 that is large enough to receive the filter therein, with the end wall 14 forming a closed end of the space 16. The housing body has an open end generally opposite the end wall 14, with the open end in use being closed by a lid that closes off the space 16. The housing body also includes an inlet opening through which fuel to be filtered enters the space 16, and an outlet 18, illustrated as extending from the end wall 14, through which fuel exits on its way to the engine. It is to be realized that the filter housing 10 could have other configurations than that described herein.

A fluid passageway member in the form of a post 20 is secured to the end wall 14 and extends upwardly into the space 16. In the illustrated embodiment, the post 20 is generally hollow from its end 22 connected to the end wall 14 to a tip end 24 thereof, thereby defining an internal fluid passageway 26. The fluid passageway 26 is in communication with the outlet 18 so that fuel that enters the post 20 can flow from the post and into the outlet 18 to the engine. The post 20 is illustrated as being centrally disposed in the housing 10 coaxial with a central axis of the housing. In other embodiments, the post 20 can be disposed offcenter from the central axis of the housing 10.

In one embodiment, the post 20 is generally oval-shaped from the end 22 to the tip end 24, similar to the posts disclosed in U.S. Pat. No. 6,884,349 and in U.S. patent application Ser. No. 11/937,700, which are herein incorporated by reference in their entirety. While this disclosure describes the post as being oval-shaped, it is to be realized that the concepts described herein could be used with a circular-shaped post and with posts having other shapes.

A flow restriction valve assembly 30 is attached to the tip end 24 of the post 20 to control the flow of fuel into the post 20 and thus to the outlet 18. In one embodiment, when the valve of the valve assembly 30 is closed, all flow of fuel into the standpipe 20 is substantially prevented when no filter is installed or when an improper filter is installed. In an alternative embodiment, when the valve of the valve assembly is closed, the valve assembly is designed to allow limited flow of fuel into the post 20 when no filter is installed or when an improper filter is installed. This limited flow allows lubrication of downstream components, such as a fuel pump, but is insufficient to allow the engine to operate. When an appropriately designed filter is installed, the filter is designed to keep the valve of the valve assembly at an open position to permit maximum fuel flow into the post.

In the illustrated embodiment, the valve assembly 30 includes a first valve assembly piece in the form of a valve body 32 that is configured for attachment to the post 20, and a second valve assembly piece in the form of a valve cover 34 configured for attachment to the valve body 32. The valve body 32 and the valve cover 34 are designed to capture a valve ball (not shown) therein. The valve ball controls fluid flow through the valve assembly and into the post 20. The valve body 32 and the valve cover 34 are made of material compatible with the fluid with which it interacts. In the case of fuel, the valve body and valve cover are made of a fuel resistant plastic. An example of a valve body, a valve cover and a valve ball is disclosed in U.S. patent application Ser. No. 11/937,700.

Figure 3:
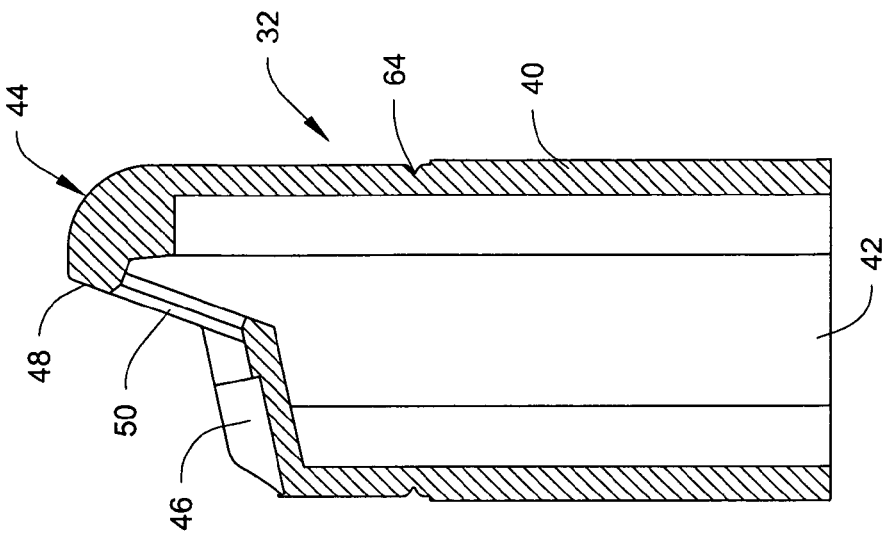
FIG. 3 is a cross-sectional view of the valve body of FIG. 2 taken along line 3-3.
Figure 2:
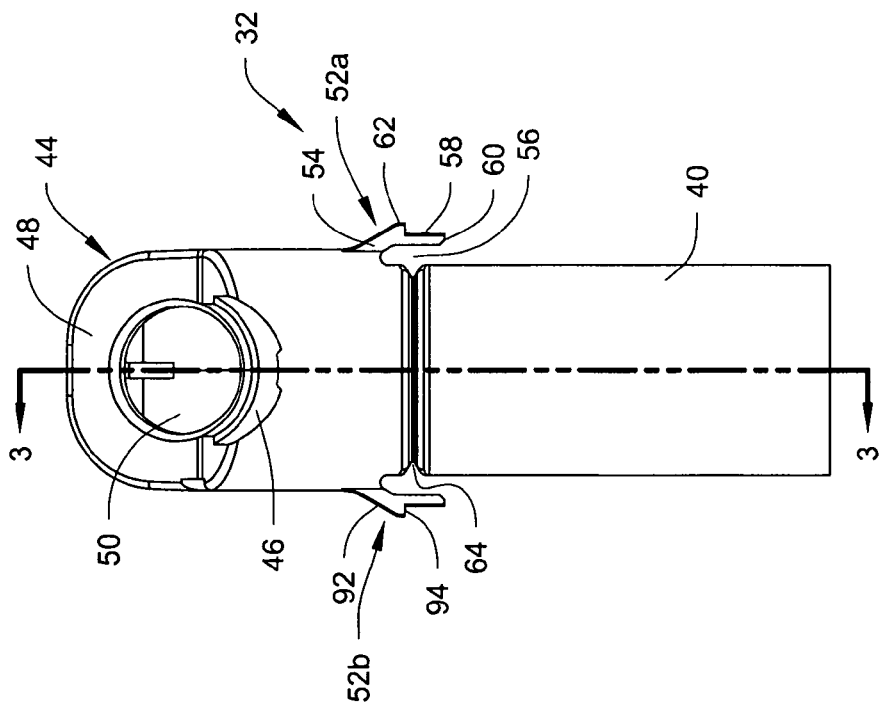
FIG. 2 is a side view of a valve body of the valve assembly.

With reference to FIGS. 2 and 3, the valve body 32 includes a first, lower portion 40 that is generally straight and elongated and configured to fit inside the fluid passageway 26 of the post 20 via a relatively tight interference fit between the outside surface of the first, lower portion 40 and the inside surface of the post 20. In the case of the oval-shaped post 20, the outside surface of the portion 40 of the valve body 32 that fits within the post will be generally oval-shaped. The lower portion 40 defines a fluid flow passage 42 that is in communication with the fluid passageway 26 when the valve assembly 30 is installed on the post.

The valve body 32 also includes a second, upper portion 44. The upper portion 44 defines a valve ball track 46 having a first end and a second end at an outer edge of the upper portion. A wall 48 of the upper portion 44 defines a fluid opening 50 at the first end of the ball track 46 that is at least partially closeable by a valve ball that in use rides on the valve ball track. The fluid opening 50 places the exterior of the valve body 32 in fluid communication with the fluid flow passage 42. Further information on the construction of the upper portion of the valve body 32, including the ball track, valve ball, and the fluid opening, can be found in U.S. patent application Ser. No. 11/937,700.

As also shown in FIG. 2, a plurality of snap tabs 52a, 52b are connected to the first portion 40 of the valve body 32. The snap tabs 52a, 52b are generally identical in construction so only the snap tab 52a will be described in detail. Although only two snap tabs are illustrated, it is to be understood that more than two snap tabs can be provided.

The snap tab 52a comprises an elongated, relatively thin piece of plastic material which in the illustrated example is integrally formed with the remainder of the valve body 32. The snap tab 52a includes an angled end 54 that integrally connects the snap tab to the first portion 40 and that spaces the snap tab 52a from the outer surface of the first portion 40 to provide a gap 56 therebetween. The opposite end 58 of the snap tab 52a is free, i.e. not directly connected to the first portion 40, to allow the end 58 to flex. The end 58 is provided with an angled surface 60 the purpose of which will be described below. In addition, the snap tab 52a is provided with a lip 62 on the outer surface thereof designed to engage with the valve cover in a manner described below.

The valve body 32 is also provided with a tamper evident feature 64. In the illustrated embodiment, the feature 64 is an engineered weak point in the form of a circumferential notch that is formed in the first portion 40 generally adjacent the ends 58 of the snap tabs 52a, 52b. The engineered weak point creates a weak point in the valve body 32 at which the valve body 32 can more readily break if someone tries to remove the valve body or otherwise tamper with the valve body 32. Once broken, the valve body 32 cannot be reattached to the post 20. Although a circumferential notch is illustrated, any other form of engineered weak point or any feature than can suitably indicate attempted tampering, can be used.

Figure 7:
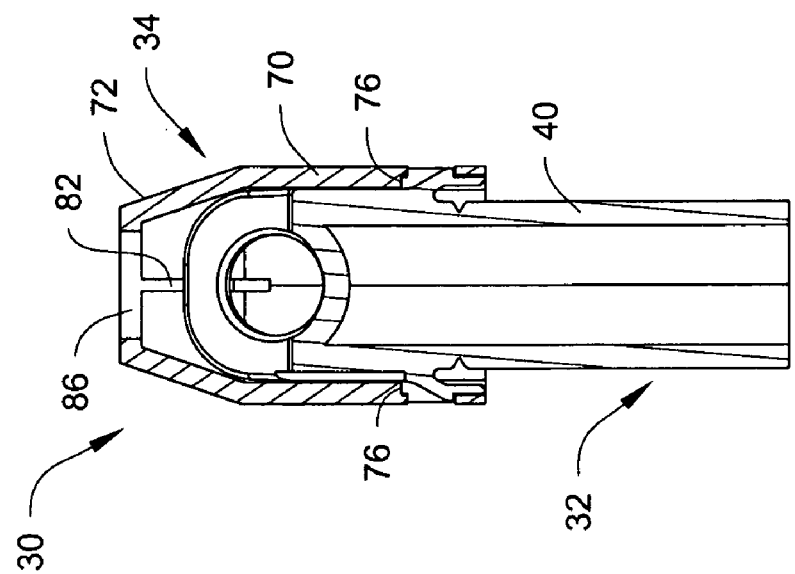
FIG. 7 is a cross-sectional view of the valve assembly with the valve cover and the valve body fully connected.

With reference to FIGS. 4 and 5, the valve cover 34 comprises a generally hollow structure with a lower skirt portion 70 and a conical top portion 72. The valve cover 34 is designed to fit over the valve body 32 and to capture the valve ball on the track 46. The interior of the skirt portion 70 fits relatively closely with the exterior of the valve body 32. The interior of the skirt portion includes shoulders 74 that engage with shoulders 76 on the valve body 32 when the valve cover 34 is fully inserted onto the valve body 32 as shown in FIG. 7.

The skirt portion 70 also includes a plurality of windows 78a, 78b that engage with the snap tabs 52a, 52b. The number of windows 78a, 78b preferably corresponds to the number of snap tabs 52a, 52, although the number of windows could outnumber the number of snap tabs. The skirt portion 70 also includes a fluid inlet 80 that allows fluid to enter the valve cover 34 and ultimately flow to the fluid opening 50 and into the post 20. When the valve cover 34 is installed, the fluid inlet 80 is disposed adjacent the second end of the ball track 46. The fluid inlet 80 is configured such that the ball cannot escape out the inlet 80.

The conical top portion 72 includes a shoulder 82 on the inside surface thereof adjacent the top that engages with the top of the valve body 32 to also help define the fully inserted position of the valve cover on the valve body. A wall 84 is disposed at the top of the conical portion 72 that generally closes the top end of the valve cover. However, a pin opening 86 is formed in the wall 84 through which a blocking pin can extend down towards the ball track 46 to block the ball and prevent the ball from blocking the fluid opening 50. Further information on blocking pins is disclosed in U.S. Pat. No. 6,884,349 and in U.S. patent application Ser. No. 11/937,700.

As shown in FIGS. 4 and 5 as an alternative to, or in addition to, the tamper evident feature 64 on the valve body 32, the valve cover 34 can include a tamper evident feature 88. The feature 88 can be an engineered weak point in the form of a circumferential notch that is formed in the skirt portion 70 above the windows 78a, 78b. The notch creates a weaker point in the valve cover 34 at which the valve cover 34 can more readily break if someone tries to remove the valve cover or otherwise tamper with the valve cover 34.

Figure 6:
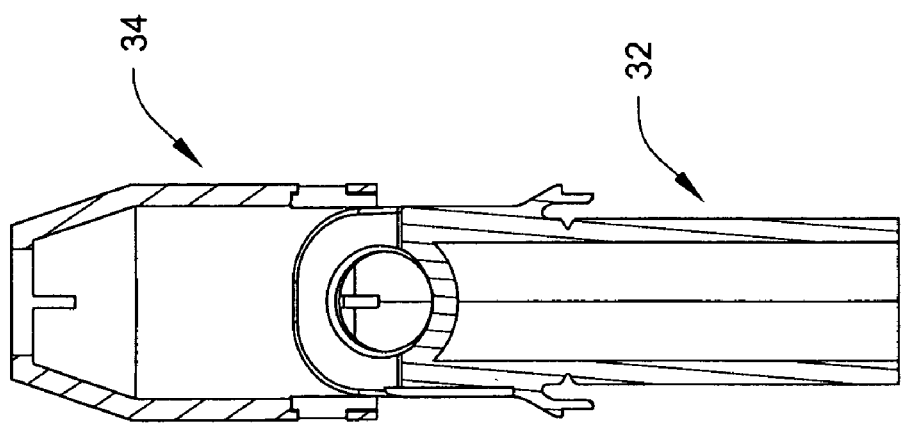
FIG. 6 is a cross-sectional view of the valve assembly with the valve cover partially connected to the valve body.

FIG. 6 shows the valve cover 34 partially installed on the valve body 32, while FIG. 7 shows the valve cover 34 fully installed on the valve body 32 to form the valve assembly 30. As the valve cover is being installed onto the valve body, the interior surface of the skirt portion 70 slides along the outer surface of the snap tabs 52a, 52b. When the bottom edge 90 reaches the lips 62, the edge 90 engages the sloped surfaces 92 (FIG. 2) of the lips, thereby causing the snap tabs 52a, 52b to deflect inward. As soon as the bottoms of the windows 78a, 78b clear the lips 62, the snap tabs 52a, 52b snap or deflect outward so that the bottom edges 94 (FIG. 2) of the lips 62 are positioned above the bottom edges of the windows in blocking position to prevent removal of the valve cover.

The valve assembly 30 is then installed onto the post 20. The lower portion 40 of the valve body 32 is inserted into the fluid passageway 26 of the post 20 through the open tip end 24. The interference fit between the lower portion 40 and the interior of the post 20 prevents fluid leakage and ensures tight connection between the valve assembly and the post.

Figure 8:
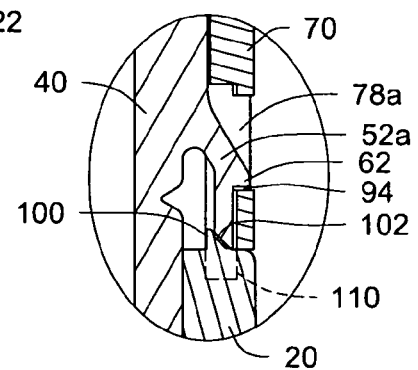
FIG. 8 is a detailed cross-sectional view of the area contained within circle 8 of FIG. 1.

FIG. 1 shows the fully installed position of the valve assembly 30 on the post 20. When the valve assembly 30 is fully installed, the bottom edge 90 of the valve cover 34 engages the top surface of the post 20 to limit the insertion, as best seen in FIG. 8. To deter removal of the valve assembly, the post 20 is provided with means to prevent removal of the valve cover 34 from the valve body 32.

As shown in FIG. 8, the means to prevent removal comprises a lip 100 formed on the top surface of the post 20. The lip 100 includes an angled blocking surface 102. When the valve assembly 30 is installed, the lip 100 is disposed behind the ends 58 of the snap tabs 52a, 52b to prevent inward deflection of the snap tabs. This prevents removal of the valve cover 34 because the snap tabs cannot be deflected inwardly sufficiently to deflect the lips out of the windows. At the same time, the angled surfaces 60 at the ends 58 of the snap tabs 52a, 52b engage the angled blocking surface 102. This engagement forces the ends 58 of the snap tabs 52a, 52b outward which helps ensure that the lips 62 remain in the windows 78a, 78b to prevent removal of the valve cover 34.

An alternative means to prevent removal is illustrated in dashed lines in FIG. 8. In this alternative, the means to prevent removal comprises a groove or channel 110 formed in the end surface of the post 20. When the valve assembly is installed, the ends 58 of the snap tabs 52a, 52b are designed to be disposed within the channel 110. When the ends are disposed in the channel 110, the ends 58 of the snap tabs cannot be deflected inwardly which would be necessary to achieve removal of the valve cover from the valve body.

In addition, the interference fit between the valve assembly 30 and the post 20 is of such magnitude that if someone tries to remove the valve assembly 30, the engineered weak point is designed to break at a lower force than the interference force. Therefore, attempted removal of the valve assembly will cause the valve body and/or the valve cover to break, thereby providing an indication that someone has tried to tamper with the valve assembly 30. Means other than an interference fit can be used to secure the valve assembly in the post, for example an adhesive or a chemical weld.

Figure 10:
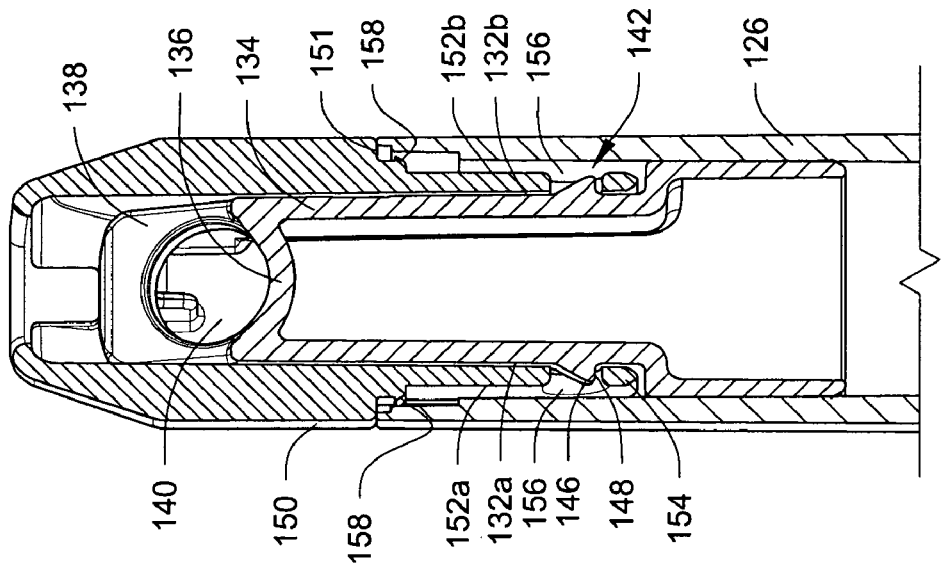
FIG. 10 is a cross-sectional view of the valve assembly of FIG. 9 installed in a post of a fuel filter housing.
Figure 9:
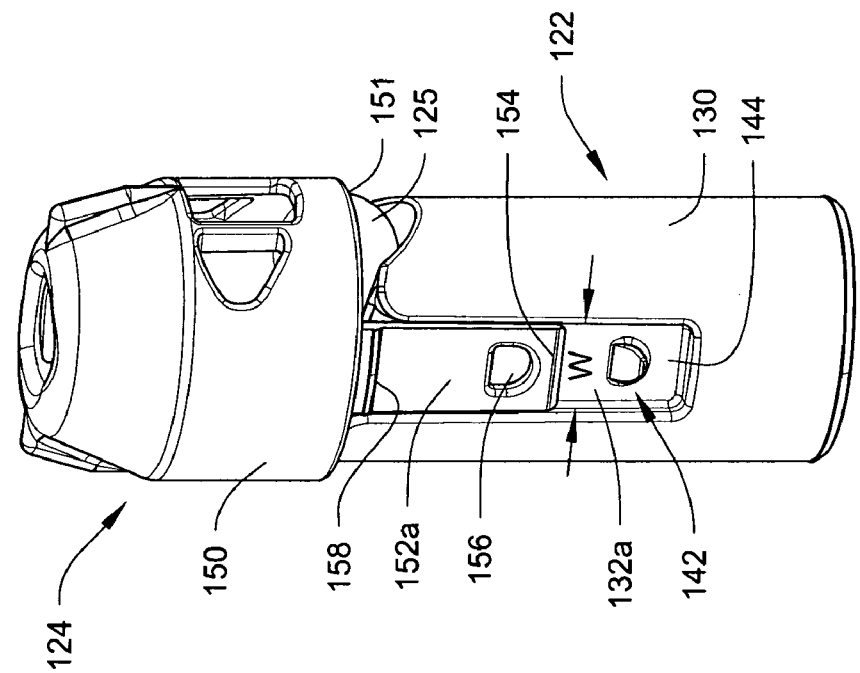
FIG. 9 is a perspective view of another embodiment of a snap lock valve assembly.

FIGS. 9 and 10 illustrate another embodiment of a valve assembly 120. The valve assembly 120 includes a first valve assembly piece in the form of a valve body 122, and a second valve assembly piece in the form of a valve cover 124. The valve assembly 120 is configured to attach by interference fit to a post 126. As with the valve assembly 30, the valve body 122 and the valve cover 124 are designed to capture a valve ball 125 therein that controls fluid flow into the post 126.

The valve body 122 includes a first, lower portion 130 that is generally straight and elongated and configured to fit inside the fluid passageway of the post 126 via a relatively tight interference fit between the outside surface of the first, lower portion 130 and the inside surface of the post 126. In the case of an oval-shaped post, the outside surface of the portion 130 of the valve body 122 that fits within the post will be generally oval-shaped. The lower portion 130 defines a fluid flow passage that is in communication with the fluid passageway of the post when the valve assembly 120 is installed on the post.

The valve body 122 also includes a second, upper portion 134. The upper portion 134 is generally similar in construction to the upper portion 44 of the valve body 32 of FIGS. 2-3, including having a valve ball track 136, a wall 138 defining a fluid opening 140 that is at least partially closeable by a valve ball that in use rides on the valve ball track. The fluid opening 140 places the exterior of the valve body 122 in fluid communication with the interior of the valve body.

Opposing slots 132a, 132b extend from the lower portion 130 upward to and through the sides of the upper portion 134. In the illustrated embodiment, the slots 132a, 132b comprise rectangular indentations formed on opposing sides of the valve body. The sides correspond to the sides on which the snap tabs 52a, 52b in FIG. 2 are shown. The slots 132a, 132b are preferably formed so that the valve cover 124 cannot be installed in the wrong orientation. For example, the slots 132a, 132b can have the same height, but have different widths w (only the width w for slot 132a is visible in the figures). In addition, a protrusion 142 is formed adjacent a base end 144 of each slot 132a, 132b. Each protrusion has a sloped surface 146 that angles outwardly from the indentation surface, and a bottom surface 148.

The valve cover 124 is similar in construction to the valve cover 34 in FIGS. 4-5. However, the valve cover 124 does not have windows 78a, 78b on its skirt portion 150. A pair of opposed tabs 152a, 152b extend downwardly from the base 151 of the skirt portion 150. The tabs 152a, 152b comprise rectangular members fixed at one end to the base 151 of the skirt portion 150 and having free ends 154. The tabs 152a, 152b have substantially the same length, but have different widths matching the different widths of the slots 132a, 132b. This ensures that the valve cover 124 can only be installed on the valve body 122 in one orientation.

A window 156 is formed in each tab near the free ends 154 thereof. In addition, a protrusion 158 is formed on each tab adjacent the ends thereof connected to the skirt portion 150. The protrusions 158 help form seals between the upper ends of the tabs and the inside surface of the post 126 when the valve assembly 120 is installed on the post 126, to prevent fluid leakage between the post and the tabs.

With reference to FIG. 9, to install the valve cover 124 on the valve body 122, the tabs 152a, 152b are aligned with the slots 132a, 132b, respectively. The valve cover 124 is then pushed down toward the valve body 122. The tabs 152a, 152b are positioned and sized to fit within the slots 132a, 132b. If the tabs 152a, 152b are incorrectly aligned with the slots 132b, 132a, respectively, the different widths of the tabs and slots will prevent installation of the valve cover. As the valve cover 124 continues to be pushed down onto the valve body 122, the ends 154 of the tabs reach the protrusions 142 and the ends 154 of the tabs are deflected outward by the sloped surfaces 146. As soon as the bottoms of the windows 156 clear the protrusions 142, the tabs 152a, 152b snap or deflect inward so that the bottom surfaces 148 of the protrusions 142 are positioned above the bottom edges of the windows in blocking position to prevent removal of the valve cover. In addition, since the tabs are disposed in the slots, rotation of the valve cover 124 and the valve body 122 relative to each other is prevented.

The valve assembly 120 is then installed onto the post 126. The lower portion 130 of the valve body 122 is inserted into the post 126 through the open end. The valve assembly is inserted until the base 151 of the skirt portion 150 contacts the upper end of the post as shown in FIG. 10. The interference fit between the lower portion 130 and the interior of the post prevents fluid leakage and ensures tight connection between the valve assembly and the post. The tabs 152a, 152b are also disposed within the post which prevents access to the tabs which is necessary in order to deflect the tabs outward to remove the valve cover from the valve body.

Similar to the embodiments described in FIGS. 1-8, an engineered weak point can be formed in either or both of the valve body and the valve cover of the valve assembly 120. In the valve assembly 120, the engineered weak point is the side walls of the windows 156. The valve body 122 is completely covered by the valve cover 124, so there is no way to grab the valve body 122. Instead, one must grab the valve cover during attempted removal. The interference fit between the valve assembly 120 and the post is of such magnitude that if one tries to remove the valve assembly 120 through the valve cover 124, the side walls of one or more of the window 156 will break at a lower force than the interference force. Therefore, attempted removal of the valve assembly will cause the valve cover to break, thereby providing an indication that someone has tried to tamper with the valve assembly. Alternatively, an engineered weak point such as a circumferential notch similar to the notch 64 in FIGS. 2-3, can be provided on the valve body 122 either separately from, or in addition to, the engineered weak points of the windows 156. In addition, means other than an interference fit can be used to secure the valve assembly in the post, for example an adhesive or a chemical weld.

The valve assembly described herein may be embodied in other forms without departing from its spirit or characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within their scope.

The invention claimed is:

1. For use with a fuel filter housing, a valve assembly for attachment to the fuel filter housing for controlling fuel flow through the fuel filter housing, the valve assembly comprising:
   a first valve assembly piece configured for attachment to the fuel filter housing;
   a second valve assembly piece connected to the first valve assembly piece;
   a snap connection between the first piece and the second piece by which the first piece and the second piece snap fit connect to each other;
   wherein the snap connection is configured and positioned such that when the valve assembly is attached to the fuel filter housing, disconnection of the snap connection is prevented by the fuel filter housing;
   the first valve assembly piece includes a valve body that includes: a first portion that is sized and configured to connect to a post of the fuel filter housing and that defines a fluid flow passage, a valve ball track having a first end and a second end, and a fluid opening at the first end of the ball track that is at least partially closeable by a valve ball on the valve ball track and that places an exterior of the valve body in fluid communication with the fluid flow passage; and
   the second valve assembly piece includes a valve cover that includes: a skirt portion configured for disposition around at least a portion of the first portion of the valve body, a fluid inlet in the skirt portion for allowing fluid to enter the valve cover and that is disposed adjacent the second end of the ball track, and a wall connected to the skirt portion that includes a pin opening therethrough.

2. The valve assembly of claim 1, wherein the first valve assembly piece includes a plurality of snap tabs, and the second valve assembly piece includes a plurality of windows that engage with the snap tabs.

3. For use with a fuel filter housing, a valve assembly for attachment to the fuel filter housing for controlling fuel flow through the fuel filter housing, the valve assembly comprising:
   a first valve assembly piece configured for attachment to the fuel filter housing; a second valve assembly piece connected to the first valve assembly piece;
   a snap connection between the first piece and the second piece by which the first piece and the second piece snap fit connect to each other;
   wherein the snap connection is configured and positioned such that when the valve assembly is attached to the fuel filter housing, disconnection of the snap connection is prevented by the fuel filter housing; and
   the snap connection comprises the second valve assembly piece including a plurality of snap tabs, each snap tab including a window, and
   further comprising a plurality of slots formed in the first valve assembly piece, and the snap tabs are disposed within the slots.

4. For use with a fuel filter housing, a valve assembly for attachment to the fuel filter housing for controlling fuel flow through the fuel filter housing, the valve assembly comprising:
   a first valve assembly piece configured for attachment to the fuel filter housing;
   a second valve assembly piece connected to the first valve assembly piece;
   a snap connection between the first piece and the second piece by which the first piece and the second piece snap fit connect to each other;
   wherein the snap connection is configured and positioned such that when the valve assembly is attached to the fuel filter housing, disconnection of the snap connection is prevented by the fuel filter housing; and
   a tamper evident feature provided on at least one of the first valve assembly piece and the second valve assembly piece.

5. The valve assembly of claim 4, wherein the tamper evident feature comprises at least one engineered weak point formed on the first valve assembly piece or on the second valve assembly piece.

6. A combination comprising:
a fuel filter housing that includes a post;
a valve assembly attached to the fuel filter housing for controlling fuel flow through the fuel housing, the valve assembly including:
i) a first valve assembly piece attached to the fuel filter housing, the first valve assembly piece includes a valve body that includes: a first portion connected to the post of the fuel filter housing and that defines a fluid flow passage, a valve ball track having a first end and a second end, and a fluid opening at the first end of the ball track that is at least partially closeable by a valve ball on the valve ball track and that places an exterior of the valve body in fluid communication with the fluid flow passage;
ii) a second valve assembly piece connected to the first valve assembly piece, the second valve assembly piece includes a valve cover that includes: a skirt portion disposed around at least a portion of the first portion of the valve body, a fluid inlet in the skirt portion for allowing fluid to enter the valve cover and that is disposed adjacent the second end of the ball track, and a wall connected to the skirt portion that includes a pin opening therethrough;
iii) a snap connection between the first piece and the second piece by which the first piece and the second piece snap fit connect to each other; and
wherein the snap connection is configured and positioned such that disconnection of the snap connection is prevented by structure of the fuel filter housing.

7. The combination of claim 6, wherein the first valve assembly piece includes a plurality of snap tabs, and the second valve assembly piece includes a plurality of windows that engage with the snap tabs.

8. A combination comprising:
a fuel filter housing;
a valve assembly attached to the fuel filter housing for controlling fuel flow through the fuel housing, the valve assembly including:
i) a first valve assembly piece attached to the fuel filter housing;
ii) a second valve assembly piece connected to the first valve assembly piece;
iii) a snap connection between the first piece and the second piece by which the first piece and the second piece snap fit connect to each other; and
wherein the snap connection is configured and positioned such that disconnection of the snap connection is prevented by structure of the fuel filter housing, and the snap connection comprises the second valve assembly piece including a plurality of snap tabs, each snap tab including a window, and
further comprising a plurality of slots formed in the first valve assembly piece, and the snap tabs are disposed within the slots.

9. A combination comprising:
a fuel filter housing;
a valve assembly attached to the fuel filter housing for controlling fuel flow through the fuel housing, the valve assembly including:
i) a first valve assembly piece attached to the fuel filter housing;
ii) a second valve assembly piece connected to the first valve assembly piece;
iii) a snap connection between the first piece and the second piece by which the first piece and the second piece snap fit connect to each other; and
wherein the snap connection is configured and positioned such that disconnection of the snap connection is prevented by structure of the fuel filter housing, and
a tamper evident feature provided on at least one of the first valve assembly piece and the second valve assembly piece.

10. The combination of claim 9, wherein the tamper evident feature comprises at least one engineered weak point formed on the first valve assembly piece or on the second valve assembly piece.

11. A combination comprising:
a fuel filter housing;
a valve assembly attached to the fuel filter housing for controlling fuel flow through the fuel housing, the valve assembly including:
i) a first valve assembly piece attached to the fuel filter housing;
ii) a second valve assembly piece connected to the first valve assembly piece;
iii) a snap connection between the first piece and the second piece by which the first piece and the second piece snap fit connect to each other; and
wherein the snap connection is configured and positioned such that disconnection of the snap connection is prevented by structure of the fuel filter housing, and the snap connection comprises the second valve assembly piece including a plurality of snap tabs, each snap tab including a window, and
wherein each window includes side walls that are designed to break upon removal of the valve assembly from the fuel filter housing.

12. The combination of claim 6, wherein the post has an oval-shaped cross-section or a circular cross-section.

13. The combination of claim 6, wherein the structure of the fuel filter housing comprises a groove formed in the post and a portion of the snap connection is disposed in the groove, a lip on the post that is disposed behind the snap connection, or the post itself.

* * * * *